United States Patent [19]
Gates et al.

[11] 3,838,494
[45] Oct. 1, 1974

[54] METHOD OF ASSEMBLING BELL AND CAGE UNITS TO FORM PIPE REINFORCING CAGES

[75] Inventors: Robert H. Gates, Columbus; Harold G. Schneider, Westerville, both of Ohio

[73] Assignee: Concrete Pipe Machinery Company, Sioux City, Iowa

[22] Filed: May 16, 1973

[21] Appl. No.: 360,628

[52] U.S. Cl. ................. 29/453, 29/460, 285/288
[51] Int. Cl. ............................................ B23p 11/02
[58] Field of Search .......... 29/453, 460 X; 140/107; 138/175, 176; 285/288 X

[56] References Cited
UNITED STATES PATENTS

| 860,400 | 7/1907 | Maag | 138/175 X |
|---|---|---|---|
| 1,267,835 | 5/1918 | Zwicker | 138/175 |
| 1,344,779 | 6/1920 | Trammell | 285/288 |
| 1,904,976 | 4/1933 | Barder | 29/453 X |
| 1,929,497 | 10/1933 | Kilmer | 29/453 |
| 1,976,589 | 10/1934 | Trickey | 138/175 X |
| 2,576,012 | 11/1951 | Gurek | 285/288 |
| 2,662,555 | 12/1953 | Hirsh | 138/176 X |
| 3,578,036 | 5/1971 | Francois | 138/175 X |

Primary Examiner—Charlie T. Moon
Attorney, Agent, or Firm—Strauch, Nolan, Neale, Nies & Kurz

[57] ABSTRACT

A method of assembling together a bell unit and a cage unit to form a pipe reinforcing cage including snap-fitting a connector onto both the bell unit and the cage unit so as to form a unitary pipe reinforcing cage.

13 Claims, 4 Drawing Figures

METHOD OF ASSEMBLING BELL AND CAGE UNITS TO FORM PIPE REINFORCING CAGES

BACKGROUND OF THE INVENTION

In the production of concrete pipe sections, internal reinforcing cages are used to strengthen the concrete pipe sections. These cages ordinarily are made of a cage unit which may support the barrel portion of the concrete pipe section and a bell unit which may support the bell portion of the section. The cage unit and bell unit are usually together by welding joints or metal ties to form a completed reinforcing cage.

In applicants' application Ser. No. 135,093, filed Apr. 19, 1971, now abandoned, and in their co-pending application Ser. No. 289,740, filed Sept. 15, 1972, they stressed that a bell unit and a cage unit can be joined together by snap-fitting an end portion of the bell unit onto an end portion of a cage unit to thereby form a unitary pipe reinforcing cage.

While the aforementioned systems have been generally satisfactory, there is always a need to improve upon them to increase speed of assembly of the units together.

It is an object of this invention to provide a method whereby a bell unit and a cage unit may be simply and efficiently assembled together to form a pipe-reinforcing cage without the need to utilize or a wire tieing operation in the overall assembling technique. Other objects will become apparent to those skilled-in-the-art from an inspection of the description hereinafter set forth.

STATEMENT OF THE INVENTION

In accordance with certain of its aspects, the novel method of this invention of assembling a bell unit and a cage unit to form a pipe reinforcing cage may comprise positioning a bell-cage connector between the bell unit and the cage unit and snap-fitting the connector onto the bell unit and the cage unit so as to form a unitary pipe reinforcing cage.

DESCRIPTION OF THE INVENTION

The pipe reinforcing cage to which this invention relates comprises a bell unit and a cage unit. The cage unit may be of any conduit shape but preferably, it may be generally cylindrical and includes a plurality of wire elements bound together to form an elongated cylindrical unit having a pair of open ends. This unit may carry a plurality of co-axially positioned circular circumferential members and a plurality of longitudinal support members secured to the circular members at various points along the circumference thereof by means of weld joints, wire ties, or the like. The cage unit may provide a suitable support for the main portion of a concrete pipe section.

The bell unit may be of any conduit shape but it may preferably be generally cylindrical and include a plurality of wire elements bound together to form a somewhat narrow cylindrical unit having a pair of open ends. This unit may carry a plurality of co-axially positioned circular circumferential members and a plurality of longitudinal support members secured to the circular members at various points along the circumference thereof by means of weld joints, wire ties, or the like. The diameter of the cylindrical section of the bell unit may be larger than the diameter of the cylindrical section of the cage unit. The bell unit may provide a suitable support for the bell portion of a concrete pipe section.

The bell unit and the cage unit may be positioned relative to one another by the use of one or more bell-cage connectors which may take on a variety of shapes. Typically, the connectors may be a metal clip, wire clip, or like device, and they may fix the position of the bell unit and the cage unit so that each unit is spaced from one another. The particular size and shape of the bell-cage connector is not critical as long as it is capable of being snap-fitted to both the bell and cage units.

The bell-cage clip may preferably comprise three distinct sections which may include a generally U-shaped first section and a generally straight intermediate which adjoins the first section. Additionally, the clip may carry a third section which may be adjoined to the intermediate section. The third section may have a plurality of loops arranged therealong, the purpose of which will be hereinafter described.

The first section of the clip, more particularly, may be provided with a curved end portion and two adjoining generally straight portions, the latter of which may converge together to form the generally U-shaped first section aforementioned.

The generally straight intermediate section of the clip may adjoin the first section opposite to its curved end portion. This intermediate section may extend outwardly from the U-shaped first section in a direction away from the concave opening of U-shaped first section.

The third section of the clip may adjoin the intermediate section and may extend at right angles thereto. It may carry a plurality of adjoining straight portions and looped portions which may be arranged alternately next to one another therealong. The third section may also be provided with an end portion which may be turned to form a curved end.

The method of assembling together the bell unit and the cage unit is hereinafter described. The bell unit and a cage unit may be situated on a surface next to each other in such a way that the open end of the bell unit may be positioned generally concentric with respect to the open end of the cage unit. The bell-cage connector may then be positioned between the bell unit and the cage unit in order to fix this bell unit with respect to the cage unit. The bell-cage connector may be secured to both the bell unit and the cage unit by snap-fitting the connector to each unit to thereby form a unitary pipe reinforcing cage.

With respect to the method of assembly using a plurality of the preferred type of connector that may find use in the practice of this invention, namely, the clip that was previously described in detail, the bell unit may be positioned on a surface such that one open end projects vertically upwardly. Subsequently, the U-shaped section of each connector may be pressed into contact with the circular members of the bell unit so that the ends of the U-shaped sections may be snap-fitted about two circumferential members of the bell unit. In this position the looped sections of the connectors may extend vertically upwardly. The cage unit may then be lowered over the clips so that the looped section of the clips may slide along the surface of the circumferential members of the cage unit until the loops on the loop sections snap-fit around the circumferential cage unit members, thereby fixing the position of the bell unit with respect to the cage unit.

In the practice of the modified form of the invention the method of assembling together the bell unit and the cage unit includes positioning a bell-cage connector between the bell unit and the cage unit, snap-fitting one end portion of the connector to the bell unit and looping the other end portion of the connector about a circular member in the cage unit.

The modified connector may be a clip which has generally U-shaped section and a first generally straight section adjoining the U-shaped section. These two sections may be generally the same as the first two sections of the clip described previously. In the modified embodiment, the clip also carries a generally straight second section that may extend perpendicular to the first straight section.

In carrying out the method of using a plurality of clips as so modified, the U-shaped sections of the clips may be pressed into contact with the circumferential members of the bell unit such that the ends of the U-shaped section snap-fit about two circumferential members of the bell unit. In this arrangement the cage unit may then be moved toward the clips and the second straight section of clips may slide along the surface of the circumferential members of the cage unit until the open end of the cage unit abuts up against the first straight section of the clips. Subsequently, the ends of the second straight section may then be manually, or otherwise, bent to loop around a circumferential cage unit member to fix or lock the bell unit and cage unit with respect to each other to form a pipe reinforcing cage.

It is important to observe that by the practice of this invention, a bell unit and cage unit are easily and efficiently brought together in a concentric manner for assembly in order to form pipe reinforcing cages for use as concrete pipe reinforcing elements.

DESCRIPTION OF THE PREFERRED EMBODIMENTS

Figure 1:
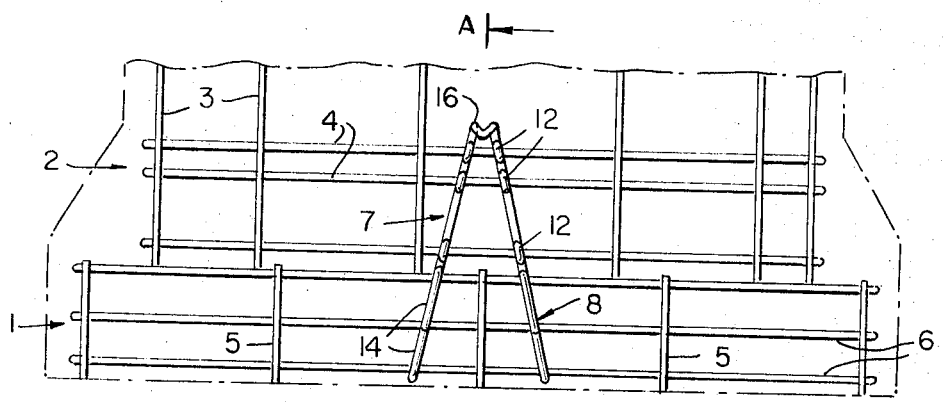
FIG. 1 is a partial side view of the assembled pipe reinforcing cage.
Figure 2:
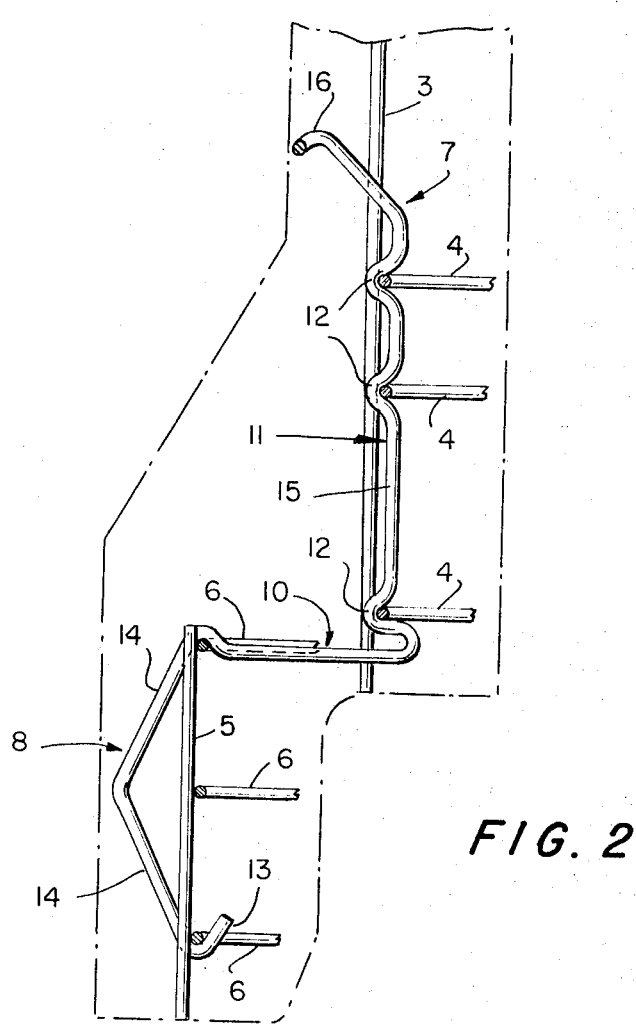
FIG. 2 is a blown-up partial sectional side veiw showing in detail the bell-cage connector taken along line A—A of FIG. 1.

The pipe reinforcing cage of FIG. 1 may comprise a bell unit, generally indicated by 1, and a cage unit, generally indicated by 2. The cage unit 2 may be cylindrical and may include a plurality of wire elements bound together to form an elongated cylindrical unit having a pair of open ends. This cage unit 2 may carry a plurality of longitudinal support members 3 and a plurality of circumferential members 4 affixed together by weld joints. The bell unit 1 may also be cylindrical and include a plurality of wire elements bound together to form a somewhat narrow cylindrical unit having a pair of open ends. The bell unit 1 may carry a plurality of longitudinal support members 5 and a plurality of circumferential members 6 affixed together by weld joints. The diameter of the cylindrical section of the bell unit 1 may be larger than the diameter of the cylindrical section of the cage unit 2.

The bell unit 1 and the cage unit 2 may be positioned relative to one another by the use of a plurality of bell-cage wire clips 7. Each wire clip 7 may have a U-shaped first section 8 and a straight intermediate section which adjoins the first section 10. Additionally, the wire clip 7 may carry a third section 11 which may be adjoined to the intermediate section 10. The third section 11 may have a plurality of loops 12 arranged therealong.

The first section 8 of the wire clip 7 may be provided with a curved end portion 13 and two adjoining straight portions 14, the latter of which may converge together to form the U-shaped section 8 aforementioned.

The straight intermediate section 10 of the wire clip 7 may adjoin the first section 8 opposite to its curved end portion 13. This intermediate section 10 may extend outwardly from the U-shaped first section 8 in a direction away from the concave opening of the U-shaped first section 8.

The third section of the wire clip 11 may adjoin the intermediate section 10 and may extend at right angles thereto. It may carry a plurality of adjoining straight portions 15 and loops 12 which may be arranged alternately next to one another therealong. The third section 11 may also be provided with an end portion 16 which may be turned to form a curved end.

The bell unit 1 and the cage unit 2 may be assembled together by first positioning the bell unit 1 on a surface such that one open end projects vertically upwardly. subsequently, the U-shaped sections 8 of a plurality of wire clips 7 may be pressed into contact with the circular members 6 of the bell unit 1 so that the U-shaped sections 8 may be snap-fitted about two circumferential members 6 of the bell unit 1. In this position the looped sections 11 of the wire clips 7 may extend vertically upwardly. The cage unit 3 may then be lowered over the clips 7 so that the looped sections 11 of the clips 1 may slide along the surface of the circumferential members 4 of the cage unit 2 until the loops 12 of the loop section 11 snap-fit around the circumferential cage unit members 4.

Figure 3:
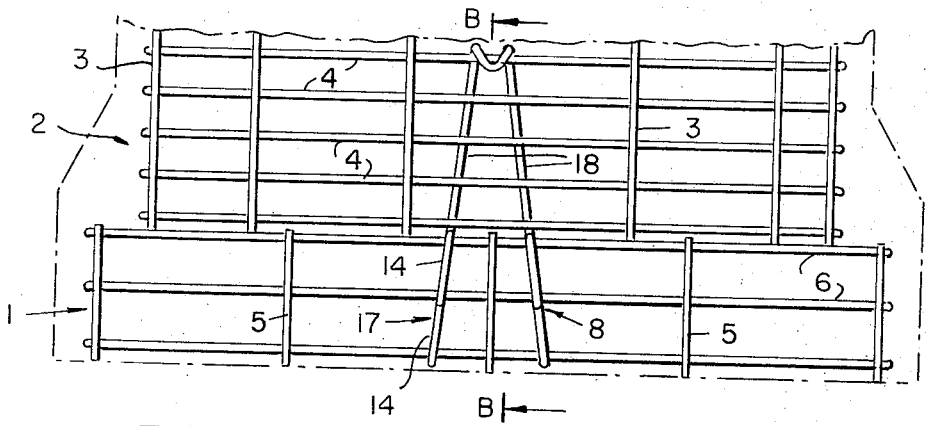
FIG. 3 is a partial side view of an assembled pipe reinforcing cage as modified.
Figure 4:
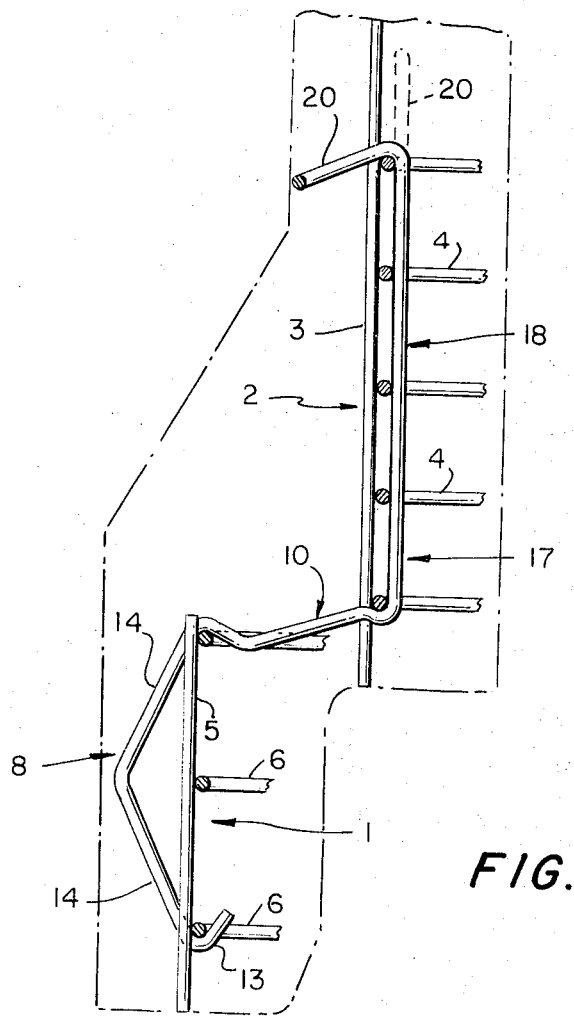
FIG. 4 is a blown-up partial sectional side view showing in detail a modified bell-cage connector taken along line B—B of FIG. 3.

Turning now to the modified form of the invention as illustrated in FIGS. 3 and 4, the modified bell-cage wire clip 17 may have a U-shaped section 8. and a first straight section 10 adjoining the U-shaped section 8. These sections may be the same as the first two sections of the wire clip previously described. In the modified embodiment the wire clip 17 also carries a second straight section 18 that may extend perpendicular to the first straight section 10.

In carrying out the method using a plurality of modified wire clips 17, the U-shaped sections 8 of the wire clips 17 may be pressed into contact with the circumferential members 6 of the bell unit 1 so that the ends of the U-shaped sections 8 snap-fit about two circumferential members 6 of the bell unit 1. The cage unit 2 may then be moved towards the wire clips 17 and the second straight sections 18 of the wire clips 17 may slide along the surface of the circumferential members 4 of the cage unit 2 until the open end of the cage unit 2 abuts up against the first sections 10 of the wire clips 17. Subsequently, the ends 20 of each of the second straight sections 18 may then be manually, or otherwise, bent to loop around one of the circumferential cage unit member 4 to fix or lock the bell unit 1 and the cage unit 2 with respect to each other to form the pipe reinforcing cage.

Although this invention has been described with reference to certain aspects and certain embodiments, it will be apparent to those skilled-in-the-art that change and modifications may be made thereto which fall within the scope of the claims.

We claim:

1. The method of assembling together a bell unit and a cage unit to form a pipe reinforcing cage comprising positioning a bell-cage connector between the bell unit and the cage unit and snap-fitting the connector onto the bell unit and the cage unit so as to form a unitary pipe reinforcing cage.

2. The method of claim 1, wherein one end portion of the connector is snap-fitted to the bell unit and the other end portion of the connector is snap-fitted to the cage unit.

3. The method of claim 2, wherein the connector is a wire clip.

4. In a method of assembling together a bell unit and a cage unit to form a pipe reinforcing cage the improvement comprising snap-fitting the connector onto both the bell unit and the cage unit so as to form a unitary pipe reinforcing cage.

5. A method of assembling a bell unit and a cage unit to from a pipe reinforcing cage comprising:
   a. providing a cage unit having coaxially positioned circular circumferential members and a plurality of longitudinal support members secured to said circular members at various points along the circumference thereof;
   b. providing a bell unit having coaxially positioned circular circumferential members and a plurality of longitudinal support members secured to said circular members of the bell cage at various points along the circumference thereof, said bell unit circular members having a diameter larger than the diameter of the circular members of the cage unit; and
   c. providing at least one connector having a pair of end portions;
   d. snap-fitting one end portion of each connector to the cage unit; and
   e. snap-fitting the other end of each end portion of the connector to the bell unit.

6. The method of claim 5, wherein the connector is a wire clip.

7. A method of assembling a bell unit and a cage unit to form a pipe reinforcing cage comprising:
   a. providing a cage unit having coaxially positioned circular circumferential members and a plurality of longitudinal support members secured to said circular members at various points along the circumference thereof;
   b. providing a bell unit having coaxially positioned circular circumferential members and a plurality of longitudinal support members secured to said circular members of the bell unit at various points along the circumference thereof, said bell unit members having a diameter larger than the diameter of the circumferential members of the cage unit;
   c. providing at least one connector having:
      1. a generally U-shaped end section;
      2. a first intermediate generally straight section adjoining the U-shaped end section;
      3. at least one loop section extending from the end of the intermediate section, said loop section being adapted to receive one of said circumferential members of said cage unit;
   d. snap-fitting the generally U-shaped end section of the connector onto a pair of circumferential members of the bell unit; and
   e. snap-fitting the loop section of the connector about a circumferential member of the cage unit.

8. A method of assembling a bell unit and cage unit to form a pipe reinforcing cage comprising:
   a. providing a cage unit having coaxially positioned circular circumferential members and a plurality of longitudinal support members secured to said circular members at various points along the circumference thereof;
   b. providing a bell unit having coaxially ositioned circular circumferential members and a plurality of longitudinal support members secured to said circular members of the bell unit at various points along the circumference thereof; said bell unit members having a diameter larger than the diameter of the circumferential members of the cage unit;
   c. providing at least one connector having:
      1. a generally U-shaped end section;
      2. an intermediate generally straight section adjoining the end section; and
      3. a loop section extending from the end of said intermediate section and comprising:
         a. a first loop portion adapted to receive one of said circumferential members of said cage units;
         b. a first straight intermediate portion extending from an end of said first loop portion in a direction generally perpendicular to the direction of said intermediate section;
         c. a second loop portion extending from an end of said straight intermediate portion, said second loop portion being adapted to receive one of said circumferential members of said cage unit, the distance between said first and second loop portions corresponding to the distance between adjoining circumferential members of said cage unit;
         d. a second intermediate straight portion extending from an end of said second loop portion in a direction generally parallel to and normal to the second intermediate portion;
         e. a third loop portion extending from an end of said second intermediate portion, said third loop section being adapted tO receive one of said circumferential members of said cage unit, the distance between said second and third loop portions corresponding to the distance between adjoining circumferential members of said cage unit;
   d. snap-fitting the generally U-shaped end section of the connector onto a pair of circumferential members of the bell unit; and
   e. snap-fitting each looped portion of the connector about a circumferential member of the cage unit.

9. The method of assembling together a bell unit and a cage unit to form a pipe reinforcing cage comprising positioning a bell-cage connector between the bell unit and the cage unit, snap-fitting an end portion of the connector to the bell unit and looping the other end portion of the connector about a member in the cage unit.

10. In a method of assembling together a bell unit and a cage unit to form a pipe reinforcing cage, the improvement comprising positioning a bell-cage connector between the bell unit and the cage unit, snap-fitting an end portion of the connector to the bell unit and looping the other end portion of the connector about a member in the cage unit.

11. The method of claim 9, wherein the connector is a wire clip.

12. The method of assembling together a cylindrical bell unit and a cylindrical cage unit by means of a plurality of intermediate bell-cage connectors to form a pipe reinforcing cage, said cage unit having spaced apart circumferential members positioned and supported by a plurality of longitudinal support members, said bell unit having coaxially positioned circular circumferential members and a plurality of wire form longitudinal support members secured to said circular members, said wire connectors having a generally U-shaped end section, an adjoining generally straight intermediate section, and an adjoining generally straight end section, said straight end section and said straight intermediate section being at right angles to one another, comprising:
  a. snap-fitting the U-shaped end sections of each connector to the circumferential members of the bell unit so that the flat end sections project outwardly of the bell unit along its axis;
  b. positioning the cage unit over the flat end sections of the connectors so that the end of the cage unit rests against the straight intermediate sections of the connector; and
  c. bending the straight end sections of the clips about the circumferential members of the cage unit.

13. The method of claim 12, wherein the connectors are wire clips.

* * * * *

UNITED STATES PATENT OFFICE
CERTIFICATE OF CORRECTION

Patent No. 3,838,494        Dated  October 1, 1974

Inventor(s)  Robert H. Gates and Harold G. Schneider

It is certified that error appears in the above-identified patent and that said Letters Patent are hereby corrected as shown below:

Column 1, line 12, after "usually" insert --joined--.

Column 1, line 28, after "utilize" insert --a welding--.

Column 2, line 15, after "intermediate" insert --section--

Column 3, line 10, after "has" insert --a--.

Column 3, line 43 change "veiw" to --view--.

Column 5, claim 5, line 1 change "from" to --form--.

Column 6, claim 8, section b. line 20, change "ositioned" to --positioned--.

Column 6, claim 8, section e. line 56, change "to" to --to--.

Signed and sealed this 8th day of April 1975.

(SEAL)
Attest:

RUTH C. MASON
Attesting Officer

C. MARSHALL DANN
Commissioner of Patents
and Trademarks